Patented Jan. 2, 1951

2,536,470

UNITED STATES PATENT OFFICE 2,536,470

PREPARATION OF FREEZE-STABLE POLYVINYL ACETATE EMULSION COMPOSITIONS

Daniel Schoenholz, Bronx, N. Y., and George O. Morrison, Milltown, N. J.

No Drawing. Application December 12, 1946, Serial No. 715,656

6 Claims. (Cl. 260—29.6)

INTRODUCTION

This invention relates to polyvinyl acetate emulsion compositions and formulations and processes for obtaining compositions of improved stability especially to freezing.

More particularly the present invention sets forth a process and formulation for the preparation of water dispersed paints utilizing as the pigment binder a water dispersion of polyvinyl acetate produced by the polymerization of vinyl acetate in aqueous emulsion.

During the various processes of manufacture, distribution, storage and use of paint it is obviously of importance that the compositions employed be stable to the various conditions which might cause deterioration and that the number of special precautions needed to insure final satisfactory application should be at a minimum. For example it is desirable that the processes of manufacture which can satisfactorily be employed with a wide margin of safety include most of the normal means whereby paints are commonly prepared, such as use of roller mills, ball or pebble mills, colloid mills, pony mixers and similar devices for dispersal or agitation of pigments and other paint components. Moreover, during distribution or storage of paints before use, the climatic conditions may be such as to subject the paints to extremes of temperature which may range from as high as 52° C. down to temperatures below the freezing point of water and of aqueous dispersions, temperatures at which the entire paint may freeze into a solid mass. Paints for certain uses should be able to withstand these conditions without any loss of desirable properties, and in particular should recover to their original condition upon being allowed to thaw out from a frozen state.

In addition to being stable to extreme environmental conditions these paints should maintain their original consistency and performance properties on aging under variable environmental conditions for long periods of time, several years being not uncommon where paints are concerned.

As a basis for explaining the behaviour of polyvinyl acetate emulsion paints under the conditions mentioned above, reference will be made to co-pending application Serial No. 707,347, Morrison, filed about November 1, 1946, wherein there are described methods for the production of such paints which are adapted to deposit films resistant to water and scrubbing, through the use of volatile solvents, swelling agents and non-volatile plasticizers for polyvinyl acetate, or combinations of the same.

These paints have shown satisfactory stability on storage at normal room temperature range. Their stability at elevated temperatures up to 52° C. has also been satisfactory. But, they have not been stable to the effects of freezing, but have remained either as rubbery indispersible gels on thawing out after subjection to freezing temperatures, or as grainy liquids, depending upon factors discussed below. In contrast, our invention relates primarily to the production of paints which are stable against the effects of freezing and thawing as well as to forces of attrition and to elevated temperatures.

OBJECTS

Accordingly, it is a broad object of the invention to provide polyvinyl acetate emulsion compositions which are stable to freezing and thawing and to forces of attrition.

It is a further object of the present invention to provide polyvinyl acetate aqueous emulsion paints that are characterized by the capacity for depositing protective and decorative films which, despite their aqueous origin, are highly resistant to water, to the effects of the natural elements, and to washing or scrubbing with commercial cleaners, including aqueous solutions of soaps or other detergent materials.

It is a further object of the present invention to provide paints free from objectionable odors or hazards resulting from the use of volatile solvents and stable against the effects of storage under conditions of high, low and freezing temperatures.

It is a further object of the invention to provide a composition consisting essentially of a polyvinyl acetate emulsion processed by addition thereto of ingredients such as plasticizer, resin or other agent, incorporated for the purpose of providing adhesion of the paint film to the surface to which applied, surface-active agents, and any other substances or compounds deemed suitable, said composition being essentially free from objectionable odors or hazards, being stable against the effects of storage under conditions of elevated, depressed or freezing temperatures, and being capable of forming, upon addition thereto of suitable pigments and fillers incorporated by the normal methods of paint manufacture, paints possessing the properties referred to above.

APPLICANTS' PROCEDURE

These objects are accomplished according to the present invention by selecting a stable aqueous emulsion formed by emulsion polymerization, preferably low in substances tending to soften the resin, and adding substantial amounts of plasticizer or swelling agent to provide for water-resistant film formation and a large amount of surface active agent to subdue the tendency of the plasticizer to cause the resin particles to coalesce. There are also added any of the other desirable constituents to form a composition or paint of a designed specification, including keying agents, pigments, fillers, and so on. The applicants recommend that the amount of plasticizer be selected from the range from about 12% to about 50% by weight of the polymer and that the amount of surface active agent be selected from the range from about 20% to about 75% of the plasticizer. Within these ranges, the specific amounts and conditions of compounding will vary for the particular formulation being prepared as will become evident from the detailed description to follow.

Paints and other compositions may be made in this way which are capable of maintaining their original consistency and properties over long periods of storage at various temperatures and of reverting to their original consistency and condition after having been frozen and then allowed to thaw out, the reversion to original consistency and condition being possible after repeated cycles of freezing and thawing.

For test purposes, the temperature at which the emulsion is frozen ranges from 30° F to −40° F. whereas the temperatures encountered during storage are extreme if they drop to −20° F. or −30° F. An upper temperature for testing purposes is 125° F. which is an extreme hot store window condition.

Paints of this type are also free from solvent odor, are capable of wetting oil paint surfaces and of forming a decorative and protective coating on various surfaces. Suitably filled they have a satisfactory degree of hiding power, resistance to the effects of the elements to water and to the effects of washing or scrubbing, and have a high degree of adhesion to old oil paint surfaces. These paints and other compositions are capable of forming when deposited on a foundation a continuous water-resistant film of the resin which will not re-emulsify or disintegrate when immersed in water for a period of twenty-four hours at a temperature of 68° F.

Films formed from these compositions and paints have the characteristics of polyvinyl acetate resin in that they closely resemble in appearance and quality films laid down from an organic solvent solution of polyvinyl acetate. Coated articles likewise partake of these excellent characteristics.

The particular emulsions which may be employed, the plasticizers, surface active agents and other constituents may be varied widely and the most appropriate selection of the constituents as well as of conditions in the preparation of the compositions will be readily apparent from the detailed description to follow.

DETAILED DESCRIPTION

Emulsions

For example, as set forth in the aforementioned copending application Serial No. 707,347, filed about November 1, 1946, the stability of polyvinyl acetate emulsion paints has been found to be dependent to some extent upon the type of emulsion employed, the emulsions varying with respect to particle size, degree of polymerization of the dispersed polyvinyl acetate, and composition and concentration of protective colloid or surface active agents present. Moreover, the inherent stability of such emulsions decreases on aging, it being well known that these emulsions are commonly required to be processed and used within a few months after manufacture to avoid the danger of gelation or spoilage of the material.

Now we have discovered that, in accordance with the new procedures described herein, practically all stable polyvinyl acetate emulsions made by emulsion polymerization can be used to make freeze-stable and attrition-stable compositions.

Examples of stable emulsions which we prefer to use, in accordance with the invention, are made by procedures described in United States Patents 2,227,163, Starck et al.; 2,388,600, Collins; 2,398,344, Collins et al.; 2,388,602, Kiar et al.; and those whose detailed description is given later in the disclosure. It will be understood that the procedures may vary. Usually, however, the resulting emulsion has a polymer concentration within the range from about 30% to about 65% by weight of the emulsion and often within the preferred range from about 50% to about 60%, a hydrophilic colloid having substantially only the hydrophilic groups effective, which colloid acts as an emulsifying agent within the range from about .3% to about 6% by weight of the total charge, and an average particle size of the dispersed resin phase within the range from about .5 to about 5 microns. The emulsion is usually polymerized in the presence of a "per" compound for example a peroxide or a perborate, varying amounts being used depending on the various conditions of the reaction and effects desired in the resulting emulsion or its components. Generally the residual monomer or other solvent in the emulsion is kept to a minimum by the conditions of polymerization, usually less than about 5% and steps are often taken to remove this residual monomer or solvent.

Since it is desirable to keep solvent odor out of paint or other coating composition, we prefer to keep the amount of residual monomer or solvent in the emulsion down to about one or two tenths of one percent by weight of the emulsion. An emulsion pH within the range from about 4 to about 7 is recommended and can be adjusted to agree with the particular filler or pigment employed. As regards polyvinyl acetate viscosity we recommend the use of resins having a viscosity from 25 cps. (in a one molar solution in benzene at 20° C.) upwards, preferably within the range from 45 cps. to 200 cps., although higher viscosities may be employed, and on some occasions lower, for example high gloss baking enamels.

The determination of the viscosity of the polyvinyl acetate itself was made on an Ostwald viscosimeter.

The emulsion viscosity may vary widely and is not a limiting factor although we have found emulsions having a viscosity within the range from 2 to 10 poises (as measured on a viscosimiter of the Hoeppler, Brookfield or Brabender types) suitable for our purposes. Surface active agents are sometimes employed to obtain small particle size of the emulsion during polymerization generally at a concentration within the range from about .05% to about 3% by weight of the emulsion. The emulsion stability is attributed to the nature and amount of hydrophilic colloid used. Sometimes plasticizers are used for the purpose of modifying the films formed from the emulsion. Generally these plasticizers and residual solvents, e. g., the monomer, find their way at least partially into the resin particles, exerting a softening effect on the resin, which tends to destroy freeze-stability. Accordingly, we prefer to select for the purposes of treatment according to the present invention an emulsion low in residual monomer and solvent as well as in initial plasticizer which may have been in the emulsion sufficiently long to make its effect felt in softening the resin particles. However, the teachings of the present invention also make it possible to compensate for the freeze-stability reducing effect of monomer, solvent, and softening-plasticizer in the starting emulsion.

*Plasticizers*

The addition of plasticizer before, during, or after polymerization to control the film properties in polyvinyl acetate emulsion coating compositions has been dealt with broadly in the prior art. We have now discovered, however, that various plasticizers exhibit widely divergent tendencies for coalescence with polyvinyl acetate particles when dispersed in a polyvinyl acetate emulsion and examined microscopically. Some plasticizers, to which we refer as "quick acting" agents, when dispersed in a polyvinyl acetate emulsion coalesce and combine with the polyvinyl acetate particles within a few hours; while other plasticizers, to which we refer as "slow acting" agents, when dispersed into a polyvinyl acetate emulsion show little or no tendency to combine with the polyvinyl acetate particles, but rather remain dispersed throughout as discrete globules. Examples of "quick acting" agents are dibutyl phthalate, butyl phthalyl butyl glycollate, and "Flexol 3 GH" of which the chemical name is diethylene glycol di-2-ethylbutyrate. Examples of "slow acting" agents are dibutyl sebacate, polyethylene glycol di-2-ethylhexoate and tricresyl phosphate. The slow and quick acting characteristics of a plasticizer are not to be confused with its plasticizing efficiency, because some slow acting plasticizers have a very high plasticizing efficiency and vice versa.

Where quick acting agents are employed, the paint films are flexible and non-cracking immediately upon drying completely; whereas films of paints made with slow acting agents are brittle immediately after drying, but become flexible upon aging over a period of a few days to several weeks depending on the variables in formulation and the conditions of drying.

In accordance with the invention, both fast and slow plasticizers and those in the twilight zone between fast and slow and mixtures of plasticizers may be employed to achieve the desired specific effect within the broad teachings of the invention. The usual plasticizers for polyvinyl acetate are recommended, preferably non-volatile liquids.

The amount of plasticizer used will vary with the plasticizing efficiency (not to be confused with its "slow" or "fast" classification) of the plasticizer, viscosity of the polymer, the amount of insoluble resin in the polymer, the concentration of polymer in the emulsion, the amount of pigment, etc. More plasticizer is indicated as plasticizing activity decreases, polymer viscosity rises, the percent insoluble resin increases, the percent of polymer in the emulsion increases, pigment increases, and with increased film or coating flexibility etc.

Following are recommended plasticizer ranges based on the weight of solid polyvinyl acetate:

| Type of Agent | Minimum | Maximum | Preferred Range |
|---|---|---|---|
| | Per cent | Per cent | Per cent |
| Quick acting | about 12 | about 40 | about 14-20 |
| Slow acting | about 14 | about 50 | about 16-30 |

The above preferred ranges are for paints containing from 25% to 50% pigment volume on the total volume of non-volatile ingredients. Paints containing from 50% to 70% pigment volume on the total volume of non-volatile ingredients will require a plasticizer concentration closer to the maximum, preferably made up of mixtures of equal parts of quick acting and slow acting agents. An example of this is given in Example 5 where the pigment volume is 60% on the volume of non-volatile ingredients. Here there is present 16% of quick acting agent (dibutyl phthalate) on the polyvinyl acetate, and 16% slow acting agent (dibutyl sebacate) on to weight of polyvinyl acetate, giving a total of 32% plasticizer on the weight of solid polyvinyl acetate. In any event the maximum plasticizer recommended on the weight of polyvinyl acetate for any paint is 50%.

So, taking into consideration slow and fast acting plasticizers, borderline ones and mixtures, the over-all range recommended is from about 12% to about 50% by weight of the polymer.

The concentrations given above are for paints, but for unpigmented compositions the lower limit may be dropped to about 5%. For the latter, the upper limit will also be somewhat lower, and we recommend up to about 20% by weight of the polymer. Usually the amount of solvent or residual monomer in the emulsion is reduced substantially to a minimum in order to avoid solvent odor and undue resin softening effect leading to freeze-instability. If, however, a certain amount of solvent does remain, its action will exert a softening effect on the resin and, for the purposes of calculating plasticizer concentration and surface active agent concentration, the solvent or monomer should be treated substantially as if it were a quick-acting plasticizer.

The term plasticizer, as used herein, covers compounds such as are incorporated in plastics to impart more or less permanent properties, e. g., softness, flexibility, resistance to shock, etc., and are relatively high boiling liquids of low volatility. Their boiling point is above and usually well above that of the so-called high boiling solvents, i. e., from 150 to 200° C., generally above about 225° C. and frequently up to about 300° C.

*Surface active agents*

Surface active or wetting agents and protective colloids are normally present in small quantities in paints, made utilizing polyvinyl acetate emulsion. We have now found, however, that by the addition of particular concentrations of surface active agents in which both hydrophilic and hydrophobic groups are effective during the compounding as taught herein we are able to produce compositions and paints which are completely stable to the effects of freezing, and which can go through at least 5 cycles of alternate freezing and thawing without impairment to appearance or properties. For example, by employing about 40% of surface active agents on the weight of the plasticizer in a paint containing about 16% on the weight of solid polyvinyl acetate of slow acting agent, we are enabled to produce paints of excellent stability particularly to the effects of freezing as hereinbefore described.

Although a wide variety of such surface active agents as mentioned above, including non-ionic, anionic, cationic and combinations of these may be employed for this purpose, we prefer to use, on the basis of cost, efficiency, wetting properties, and ability to permit incorporation of pigments containing slightly soluble polyvalent cations, a combination of the non-ionic oleic acid condensate of polyethylene oxide known commercially as "Neutronyx 228" and the anionic di-n-octyl sodium sulfosuccinate known commercially as "Aerosol O. T."

Moreover, we have found that, contrary to expectation, incorporation into our compositions and paints of surface active agents in concentrations as great as 75% on the weight of plasticizer present, did not impair the scrub- or water-resistant properties of films deposited from such compositions after allowing such films to age for a reasonable period, as from 2 weeks to 1 month.

Following are recommended ranges of surface active agents based on the weight and type of plasticizer used:

| Type of Plasticizer | Minimum Percent Surface Active Agents | Maximum Percent Surface Active Agents | Preferred Range, Percent |
|---|---|---|---|
| Quick acting | about 30 | about 75 | about 40 to 50. |
| Slow acting | about 20 | about 75 | about 30 to 40. |

The above preferred ranges are for paints containing from 25% to 50% pigment volume on the total volume of non-volatiles. Paints with from 50% to 70% pigment volume will require a surface active agent concentration closer to the minimum, no less than 20% although greater amounts may be used up to the maximum of 75%. In Example 5 which contains 60% pigment volume, there are present 20% surface active agents on the total weight of plasticizers. The apparent reason for this is that when large amounts of pigments are present they absorb some of the plasticizer and also in themselves act as a barrier to coalescence of the polyvinyl acetate particles thereby reducing the percentage of surface active agent needed.

The over-all range recommended for all purposes is above about 20% on the weight of the plasticizer, taking into consideration fast and slow plasticizers, those in the twilight zone between fast and slow, and mixtures. It is difficult to set an upper limit since there are certain variables which indicate an increased amount of plasticizer. We recommend that the surface active agent be kept below about 75% on the weight of the plasticizer.

It is interesting to note that stable emulsions can generally be rendered stable to freezing by the addition of a small amount of surface active agent, providing the residual monomeric vinyl acetate is reduced substantially to a minimum. Emulsions to which plasticizer has been added can also be rendered stable to freezing in this manner. From about 2% to about 3% upwards surface active agent by weight on the resin, added to a stable emulsion containing up to about 2% to 3% residual monomer will stabilize it to freezing, when the addition is made during compounding. We, therefore, recommend the addition of from about 2% up to about 6% surface active agent on the weight of the resin for stabilizing emulsions to freezing.

The amount of surface active agent will, of course, vary specifically for stabilizing emulsions, paint bases, paints and other compositions falling herein, within the ranges given, to compensate for other variables in the manufacture of the composition. For instance a rise in amount of surface active agent concentration is indicated in cases of, a rise in amount of monomer or solvent in the emulsion, a rise in amount of softening-plasticizer, lower particle size of the resin phase, and in the case of other increases in variables tending to unstabilize the emulsion, more surface active agent is indicated, for instance, where emulsions have been stored for long periods before processing according to this invention.

While the use of polyvinyl acetate emulsions of recent manufacture and good inherent stability combined with slow acting plasticizers and non-reactive pigments permits achievement of stability to the effects of freezing through incorporation of minimal concentration of surface active agents, the factors indicated which tend to give unstable products may generally be overcome through use of increased percentages of such surface active agents. It is understood, however, that stability to freezing cannot be obtained in extreme cases, as for example where the polyvinyl acetate emulsion is itself of too poor stability, or where too large an amount of quick-acting plasticizer is present.

*Pigments*

Most of the normally employed paint pigments, fillers and extenders, may safely be incorporated in the compositions of the present invention. A highly satisfactory pigment is titanium dioxide, but other pigments, either organic or inorganic in nature, and having the necessary fineness, may be employed. Among such pigments are bone black, Venetian red, Ruscan red, mineral black, iron oxides, lithopene, zinc sulfides, mixed pigments, like barium-titanium, calcium-titanium, magnesium-titanium, etc. Any concentration up to just below the amount which would destroy the physical properties and/or continuity of the resin film may be used.

Where a pigment is employed, the recommended range of pigment is from about 25% to about 70% on the total volume of non-volatile ingredients.

*Keying agents*

It is known that polyvinyl acetate films exhibit poor adhesion to hydrophobic surfaces, like old oil paint films. We have, however, found that by the addition of a keying agent in the form of an alkyd resin of either drying or non-drying types, or of a mixture of a drying oil such as linseed oil and an active oil paint film softener such as acetone oil, or of any oleoresinous paint, or of certain resins sold under the name "Piccolyte," "Cumar" and "Pentalyn," excellent adhesion to hydrophobic surfaces is imparted to the emulsion composition. Where an alkyd resin is used, we prefer to employ one which in the particular emulsion composition to which it is added will not cause brush fouling. By employing concentrations of about 25 to 50 parts of alkyd resin to 250 parts of solid polyvinyl acetate, the adhesion of the film to oil paint surfaces is made equal to or superior to those of one oil paint film to another. The amount of alkyd resin can, of course, be reduced, but the adhesion powers will generally likewise be correspondingly diminished.

The keying agent employed should be one that will not cause coagulation of the emulsion, nor excessive brush fouling when the paint is used. Satisfactory types of alkyd resins are the drying alkyd "Rezyl 869," and the non-drying type alkyd "Rezyl 42," both produced by the American Cyanamid & Chemical Corporation. Examples of other agents are "Piccolyte S-25" and S-85," "Cumar RS," and "Pentalyn A."

"Rezyl 869" is a linseed fatty acid modified, phthalic anhydride alkyd resin of the drying type, while "Rezyl 42" is a similar resin but of the non-drying type. "Piccolyte S-25" and "S-85" are polyterpene hydrocarbon resins of different softening point grades. "Cumar RS" is a cumarone-indene resin of soft rubber grade; while "Pentalyn A" is a pentaerythritol-rosin ester gum.

Where a keying agent is employed, the recommended range of concentration is from about 5% to about 25% by weight of the polyvinyl acetate, with the range from about 10% to about 25% preferred. Particularly efficient keying agents like "Rezyl 869" may be used at relatively low concentrations such as 6% by weight on the polyvinyl acetate.

Procedure

Instead of preparing the complete paint in one continuous operation we prefer to prepare a composition consisting essentially of polyvinyl acetate emulsion processed by addition thereto of ingredients such as plasticizer, resin or other agent incorporated for the purpose of providing adhesion of the paint film to the surface to which applied, surface active agents, and any other substances or compounds deemed suitable, excluding however any pigments, fillers or extenders for the same, said composition being designated as a "paint base," and being manufactured in a manner indicated by example below. To said paint base is added by any suitable means such as ball mill, roller mill, colloid mill, pony mixer or other paint manufacturing or processing device, pigments, fillers and extenders together with such amount of water as is found or deemed necessary or desirable. The paint base may be employed for this purpose either immediately after it has been manufactured, or it may be stored, and used after an indefinite aging period.

Through application of the same principles as hereinbefore set forth as relating to stability of paints made with polyvinyl acetate emulsions, we are enabled to produce paint bases which are similarly of excellent stability, particularly to the effects of freezing, addition of pigments to said paint bases producing paints of the same excellent stability.

It is to be understood that in our processes and formulations for the manufacture of freeze-stable paints, paint bases, or other compositions, that we do not limit ourselves to the use of only a slow acting or only a quick acting agent in each composition, but that we may employ and may in fact find it desirable to employ mixtures of such plasticizers. The latter is particularly true as concerns paints in which we incorporate large amounts of pigment of the order of 60% or 70% pigment volume on the non-volatile components, or as concerns paint bases intended for use in manufacturing such paints of high pigment volume.

EXAMPLES

In order to illustrate the invention more specifically, reference will be made first to the preparation of certain specific stable emulsions and then to examples of formulations employing these emulsions. This material should be taken in an illustrative and not necessarily in a limiting sense.

Emulsion "EA"

In the preparation of one parent emulsion there were employed the following materials.

Dispersion medium: Water_____parts__ 800
Monomer: Vinyl acetate_____do____ 900
Emulsifiers (per cent by weight on the total charge):
   (1) Gum tragacanth_____per cent__ 0.25
   (2) Partially hydrolyzed polyvinyl acetate containing 37% polyvinyl acetate by weight, made from polyvinyl acetate of viscosity 7 cps. (at 20° C.; 86 g. p. l. in benzene)_____per cent__ 0.5
Surface active agent (per cent by weight on the total charge):
   "Aerosol O. T." (sodium salt of the sulphonic acid of dioctyl succinic ester)_____per cent__ 0.1
Catalyst (per cent by weight on the vinyl acetate): Benzoyl peroxide_____ 0.166

These materials were charged into a suitable jacketed kettle equipped with a reflux condenser and effective stirring mechanism. The temperature was brought to about 66° C. (reflux temperature) and the charge was held at reflux until the temperature rose to 83° C. The charge was then cooled to about 30° C. and then dumped. The emulsion formed was stable and had about the following characteristics:

Viscosity of emulsion (20° C.)___centipoises__ 700
Total solids_____per cent__ 55
Residual vinyl acetate_____do____ .9
Polyvinyl acetate viscosity (86 g. p. l. in benzene at 20° C.)_____centipoises__ 145
Average particle size_____microns__ 3.5

The various emulsifiers which can be used in combination with one another are described in detail in copending application Serial No. 457,337, now Patent No. 2,388,600, November 6, 1945. According to this application, the colloids are classified into "negative" and "positive" types. Among suitable colloids of the negative type are hydrophilic colloidal starches, partially hydrolyzed polyvinyl acetates containing from about zero to about 35% (—2%) polyvinyl acetate, natural gums such as for example gum tragacanth and gum arabic, algae, such as for instance, agar-agar, and the commercial algin known as "Gomagel," and gelatin. Among colloids of the positive type are hydrophilic colloidal partially substituted celluloses such as methyl cellulose and benzyl cellulose, and partially hydrolyzed polyvinyl acetate containing between about 37%

(—2%) and about 43% polyvinyl acetate. The hydrophilic colloids have substantially only the hydrophilic groups effective.

Generally speaking, one of the positive type is used with one of the negative type and in certain cases, two of the negative type may be used. In any event, the two agents are employed so that they can be used at a concentration less than that at which either agent alone would stabilize the emulsion. The preferred total concentration is between about .5% and about 1.2% by weight of the emulsion, but for the present purposes, more emulsifier may be used if desired, that is, up to about 1.7%.

An anionic surface-active agent is also employed in conjunction with the colloids at a concentration between about .05% and about .3% by weight of the emulsion.

Emulsion "EB"

The following constituents were employed in substantially the following proportions.

| | |
|---|---|
| Dispersion medium: Water_____parts__ | 880 |
| Monomer: Vinyl acetate_____do____ | 900 |
| Emulsifier (per cent by weight on the total charge): Gum arabic_____per cent__ | 2.5 |
| Surface active agent (per cent by weight on the total charge): | |
| "Aerosol O. T." (sodium salt of the sulphonic acid of dioctyl succinic ester)_____per cent__ | 0.15 |
| Catalyst (per cent by weight on the vinyl acetate): | |
| Hydrogen peroxide (in the form of a 28% solution)_____per cent__ | 0.24 |
| Acid modifying agent (per cent by weight on the total charge): | |
| Glacial acetic acid_____per cent__ | 0.5 |
| Accelerator: | |
| Iron chloride (FeCl$_3$.6H$_2$O)_____do_____ | 0.002 |

The aqueous charge consisting of the emulsifiers, the surface-active agent, the modifying acid the accelerator and one-quarter of the catalyst was charged into a kettle equipped with a reflux condenser and effective stirring mechanism. Stirring was begun and one-tenth of the vinyl acetate was added. The charge was heated to reflux (about 66° C.) and the temperature was raised slowly to about 75° C. while maintaining reflux. Then, the remainder of the vinyl acetate containing the rest of the catalyst was added at a uniform rate such that the reaction temperature was easily maintained at about 78° C. and the polymerization was complete in three hours or less. The charge was cooled to about 30° C. while stirring and then dumped.

The final emulsion had substantially the following physical properties.

| | |
|---|---|
| Average particle size_____ | 0.8 micron |
| Polyvinyl acetate about 75% insoluble viscosity of remainder__ | 35 centipoises |
| Stability _____ | More than 6 months |
| Emulsion viscosity_____ | 600 centipoises (Hoeppler) |
| Solids _____ | 53% |
| pH _____ | 3.6 |
| Residual vinyl acetate_____ | 1.9% |
| Percent acid (as acetic acid)_____ | .6% to .7% |

It is important to note that the vinyl acetate is added portion-wise, for instance, a reasonable procedure is to add about 10% of the monomer initially and then to add the remainder slowly in a continuous flow. This has the effect of reducing particle size, of maintaining a narrow particle size distribution curve and of decreasing polymerization time. The Fe$^{+++}$ ion apparently acts as an accelerator in that it causes a change in the kinetics of polymerization from that of "mass" type to that associated with the "active centre propagation" type. Hence, even mild agitation results in emulsions of an exceptionally fine average particle size. The added acid acts as a controlling agent in preventing too rapid loss of catalyst. Sufficient acetic acid is preferably employed to obtain in the final emulsion a pH from about 3.2 to about 3.8 although under some conditions more acid may be used.

The emulsifiers employable are natural highly water-dispersable gums, for instance, those of the arabin type and other natural gums which tend to give relatively clear and homogeneous water dispersions. The amounts employed are preferably less than about 4% by weight of the emulsion, good results being obtained with from about 1% to about 3%, with the limitation that the emulsifier concentration-particle size relationship discussed above is maintained. If there are traces of iron in any of the constituents of the charge, for instance in the emulsifier, the amount added may be decreased and in certain cases, eliminated.

Emulsion "EC"

An emulsion was prepared in accordance with the procedure outlined for emulsion "EB" with the exception that there was employed as the emulsifier 3% by weight on the emulsion of partially hydrolyzed polyvinyl acetate made from polyvinyl acetate of viscosity of 600 centipoises (86 g. p. l. in benzene at 20° C.) and containing about 16% polyvinyl acetate.

The final emulsion had substantially the following physical properties:

| | |
|---|---|
| Viscosity of emulsion 20° C. ___centipoises__ | 800 |
| Total solids _____per cent__ | 54 |
| Residual vinyl acetate_____do____ | 1.2 |
| Polyvinyl acetate viscosity ____centipoises__ | 43 |
| Average particle size_____micron__ | 1.0 |

Other derivatives of polyvinyl acetate such as hydrophilic partial acetals or ethers may be used as the synthetic hydrophilic colloid in place of the partially hydrolyzed polyvinyl acetate employed in this emulsion. The partially hydrolyzed polyvinyl acetates preferably employable are those containing between about 10% and about 43% polyvinyl acetate. These bodies may be made from polyvinyl acetates having a viscosity within the range from about 7 to about 1000 centipoises. The amount employed is preferably less than about 4% by weight of the emulsion, good results being obtained with from about 1% to about 3%, within the limits of the particle size-emulsifier concentration relationship defined herein.

Emulsion "ED"

This emulsion was prepared by the procedure of emulsion "EA" but using the following charge:

| | |
|---|---|
| Vinyl acetate _____ | 56% |
| Water _____ | 41% |
| Partially dehydrolyzed polyvinyl acetate having an acetate group content of about 35% by weight of the resin and made from a polyvinyl acetate of viscosity about 7_____ | 3% |

Hydrogen peroxide _____ 0.02% on vinyl
acetate
Bicarbonate of soda _____ 0.04%
Acetaldehyde _____ 0.05%

This emulsion had the following characteristics:

Emulsion viscosity _____ 630 cps. (Hoeppler 20° C.)
Total solids _____ 57.5%
Particle size (average) _ 3.5 microns Generically speaking, it is seen that these preferred emulsions "EA," "EB," "EC," and "ED" are stabilized by viscous organic hydrophilic colloids stable to mild acid and base in aqueous medium and substantially neutral as to pH at a total concentration ranging from about .5% to about 4% by weight of the emulsion. It is also preferable to employ an anionic surface-active agent at a concentration ranging from about .05% to about .3% by weight of the emulsion.

The emulsion viscosity may range from about 80 centipoises to about 50 poises, the preferred range being from about 200 to about 2000 centipoises.

The polyvinyl acetate viscosity may vary from about 7 centipoises to about 1000 centipoises with viscosity from about 45 to about 200 centipoises preferred. Insoluble polyvinyl acetate may be present in relatively large amounts and the emulsion will still fall within the demands of the invention. The concentration of the polyvinyl acetate in the emulsion may range from about 30% to about 65% by weight with from about 50% to about 60% preferred.

The term "average particle size" indicates a mean particle size (diameter) as observed under a microscope of sufficiently high magnification, equipped with a scale in the eye piece which has been calibrated by observation of a scale in the field graduated to one-hundredth of a millimetre.

Emulsions "EA," "EB," and "EC" fall within the class of emulsions which are so constituted that the coordinates $x$ and $y$ are at least as small as those satisfied by the equation $$x(y-b) = k$$

in which the coordinate $x$ is the average particle size in microns and the coordinate $y$ is the percent emulsifying agent based by weight on the resin, $x$ not exceeding 5 and $y$ lying between .5 and 10 and $b$ and $k$ are constants of value .5 and 9 respectively.

Example I
PAINT

| | Parts by weight |
|---|---|
| Part A: | |
| Polyvinyl acetate emulsion (55% solids) | 450 |
| Emulsion "EB" | |
| Part B: | |
| Dibutyl sebacate | 40 |
| Alkyd resin (Rezyl 869) | 25 |
| Part C: | |
| Titanium dioxide | 200 |
| Calcium carbonate, colloidal | 50 |
| Waterground mica, 325 mesh | 50 |
| Micronized mica | 30 |
| Domestic china clay | 30 |
| Diatomaceous earth | 40 |
| Di-n-octyl sodium sulfosuccinate | 6 |
| Oleic acid condensate of polyethylene oxide | 6 |
| Water | 400 |

Example II
PAINT

| | Parts by weight |
|---|---|
| Part A: | |
| Polyvinyl acetate emulsion (55% solids) | 450 |
| Emulsion "EB" | |
| Part B: | |
| Dibutyl sebacate | 40 |
| Alkyd resin (rezyl 869) | 25 |
| Part C: | |
| Titanium dioxide | 200 |
| Calcium carbonate, colloidal | 50 |
| Waterground mica, 325 mesh | 50 |
| Micronized mica | 30 |
| Domestic china clay | 30 |
| Diatomaceous earth | 40 |
| Dodecyl dimethyl hydroxy ethyl ammonium chloride (cationic agent known commercially as Quatronyx) | 12 |
| Water | 300 |

Example III
PAINT

| | Parts by weight |
|---|---|
| Part A: | |
| Polyvinyl acetate emulsion (55% solids) | 450 |
| Emulsion "EB" | |
| Part B: | |
| Dibutyl sebacate | 40 |
| Alkyd resin (Rezyl 869) | 25 |
| Sulfated condensate of fatty acid and amine, 25% aqueous dispersion (anionic agent known commercially as Arctic Syntex T) | 48 |
| Part C: | |
| Titanium dioxide | 200 |
| Calcium carbonate, colloidal | 50 |
| Waterground mica, 325 mesh | 50 |
| Micronized mica | 30 |
| Domestic china clay | 30 |
| Diatomaceous earth | 40 |
| Water | 280 |

Example IV
PAINT

| | Parts by weight |
|---|---|
| Part A: | |
| Polyvinyl acetate emulsion (55% solids) | 450 |
| Emulsion "EB" | |
| Part B: | |
| Dibutyl sebacate | 40 |
| Alkyd resin (Rezyl 869) | 25 |
| Polyoxyalkylene derivative of sorbitan monolaurate, 25% aqueous dispersion (nonionic agent known commercially as Tween 20) | 48 |
| Part C: | |
| Titanium dioxide | 200 |
| Calcium carbonate, colloidal | 50 |
| Waterground mica, 325 mesh | 50 |
| Micronized mica | 30 |
| Domestic china clay | 30 |
| Diatomaceous earth | 40 |
| Water | 280 |

Example V
PAINT

| | Parts by weight |
|---|---|
| Part A: | |
| Polyvinyl acetate emulsion, (55% solids) | 450 |
| Emulsion "EB" | |

Part B:
Dibutyl phthalate _____ 40
Dibutyl sebacate _____ 40
Alkyd resin (Rezyl 869) _____ 35

Part C:
Titanium dioxide _____ 150
Lithopone, water dispersible grade___ 1060
Whiting _____ 182
Talc _____ 165
Domestic china clay _____ 190
Di-n-octyl sodium sulfosuccinate___ 8
Oleic acid condensate of polyethylene oxide _____ 8
Water _____ 700

*Example VI*

PAINT BASE

Parts by weight

Part A:
Polyvinyl acetate emulsion (55% solids) _____ 450
Emulsion "EB"

Part B:
Dibutyl sebacate _____ 40
Alkyd resin (Rezyl 869) _____ 25
Di-n-octyl sodium sulfosuccinate___ 6
Oleic acid condensate of polyethylene oxide _____ 6
Water _____ 36

*Example VII*

PAINT BASE

Parts by weight

Part A:
Polyvinyl acetate emulsion (55% solids) _ 450
Emulsion "EB"

Part B:
Dibutyl phthalate _____ 40
Dibutyl sebacate _____ 40
Alkyd resin (Rezyl 869) _____ 35
Di-n-octyl sodium sulfosuccinate_____ 8
Oleic acid condensate of polyethylene oxide _____ 8
Water _____ 48

*Example VIII*

Parts by weight

Part A:
Gelva emulsion (55% solids) ___ 450
Emulsion "EB"

Part B:
Dibutyl sebacate _____ 40
Alkyd resin (Rezyl 869) _____ 25
Di-n-octyl sodium sulfosuccinate___ 8
Oleic acid condensate of polyethylene oxide _____ 8
Water _____ 48

Part C:
Titanium dioxide _____ 313
Waterground mica, 325 mesh ____ 33.5
Micronized mica _____ 33.5
Domestic china clay _____ 33.2
Diatomaceous earth _____ 39

Plasticizer and alkyd resin of part B dispersed in surface active agent solution, then stirred into part A. Part C mixed into parts A and B to give paste which is passed through roller mill until smooth.

*Example IX*

Parts by weight

Part A:
Gelva emulsion (50% solids) ___ 500
Emulsion "ED"

Part B:
Dibutyl sebacate _____ 40
Alkyd resin (Rezyl 869) _____ 25

Part C:
Titanium dioxide _____ 275
Waterground mica, 325 mesh ____ 30
Micronized mica _____ 30
Domestic china clay _____ 30
Diatomaceous earth _____ 35
Di-n-octyl sodium sulfosuccinate___ 8
Oleic acid condensate of polyethylene oxide _____ 8
Water _____ 400

Pigment slurry, part C, passed through colloid mill, stirred into mixtures of parts A and B.

*Example X*

Parts by weight

Part A:
Gelva emulsion (50% solids) ___ 500
Emulsion "EA"

Part B:
Dibutyl sebacate _____ 40
Alkyd resin (Rezyl 869) _____ 25

Part C:
Titanium dioxide _____ 275
Waterground mica, 325 mesh ____ 30
Micronized mica _____ 30
Domestic china clay _____ 30
Diatomaceous earth _____ 35
Di-n-octyl sodium sulfosuccinate___ 8
Oleic acid condensate of polyethylene oxide _____ 8
Water _____ 400

Pigment slurry, part C, passed through colloid mill, stirred into mixtures of parts A and B.

*Example XI*

Parts by weight

Part A:
Gelva emulsion type, 55% solids _____ 450
Emulsion "EA"

Part B:
Dibutyl sebacate _____ 40
Di-n-octyl sodium sulfosuccinate___ 8
Oleic acid condensate of polyethylene oxide _____ 8
Water _____ 48

Plasticizer in part B dispersed in surface active agent solution, then stirred into part A.

This is an example of freezeproof plasticized emulsion.

*Example XII*

A paint was made up as in Example I except that for dibutyl sebacate in part B was substituted polyethylene glycol di-2-ethyl hexoate, known commercially as "Flexol 4 GO." This paint contained 16% slow acting plasticizer and 30% surface active agents.

*Example XIII*

A paint was made up as in Example I, except that for dibutyl sebacate in part B was substituted tricresyl phosphate. This paint contained 16% slow acting plasticizer and 30% surface active agents.

*Example XIV*

A paint was made up as in Example I with the following changes. For 40 parts dibutyl sebacate in part B substitute 5 parts dioctyl sebacate, a very slow acting agent; 20 parts dibutyl sebacate, a slow acting agent; 15 parts triethylene glycol di-2-ethylbutyrate, known commercially as Flexol 3 GH, a quick acting agent. This paint contained 2% very slow acting plasticizer, 8% slow acting plasticizer, and 6% quick acting plasticizer, giving a total of 16% mixed plasticizers. There were present 30% surface active agents on the total weight of plasticizers.

*Example XV*

A paint was made up as in Example I with the following changes. For dibutyl sebacate in part B was substituted dibutyl phthalate. In part C, 6 parts each of the surface active agents was replaced by 8 parts each. This paint contained 16% quick acting plasticizer and 40% surface active agents.

*Example XVI*

A paint was made up as in Example I with the following changes. For dibutyl sebacate in part B was substituted butyl phthalyl butyl glycollate known commercially as "Santicizer B16." In part C 6 parts each of the surface active agents was replaced by 8 parts each.

This paint will then contain 16% quick-acting plasticizer and 40% surface active agents.

*Example XVII*

A paint was made up as in Example I with the following changes. For dibutyl sebacate in part B was substituted triethylene glycol di-2-ethylbutyrate, known commercially as "Flexol 3 GH," a quick acting plasticizer. In part C, 6 parts each of the surface active agents was replaced by 8 parts each.

This paint contained 16% quick acting plasticizer and 40% surface active agents.

In each of the examples, the percentage plasticizer is by weight on the polyvinyl acetate and the percentage surface active agent is by weight on the plasticizer.

EXAMPLE PROCEDURES

The paints of Example I, II, and V may be prepared as follows:

Part A is placed into a suitable container equipped with a device for vigorous agitation, and part B is added thereto while said stirring device is in operation. Alternatively, parts A and B may be mixed by hand and then run through a colloid mill or subjected to vigorous agitation, for instance a "Lightnin" mixer. Part C is prepared by first dissolving the surface active agents indicated in any suitable portion of the water indicated, and then mixing with the pigments. This mixing may be done either with a pony mixer, or if a smoother paint film is desired, with a ball or pebble mill or colloid mill. A still finer pigment grind may be obtained by passing through a roller mill but this will generally necessitate the use of less water in the pigment mix of part C than has been indicated. The quantity of water present, however, is not critical in any range below the quantity indicated in the examples and thus may be varied at will within broad limits. If less water is employed in preparing the paint initially, a correspondingly greater amount will of course be required in diluting the paint for use.

After preparation by any of the methods indicated or by other feasible methods, the technique of preparing pigment-water mixes being well known to the art, part C is stirred into the mixture of parts A and B, the final product being a rather thick liquid requiring dilution of from 1 to 4 pints of water per gallon of paint for use; the dilution ratio depending upon the technic of the painter, the method of application, the initial water present in the paint, and the type of surface to be painted.

Examples III and IV may be prepared as follows:

Part A is placed in a suitable container equipped with a device for vigorous agitation. Part B is prepared by dispersing the mixture of plasticizer and resin into the surface active agent dispersion or solution, this being accomplished either by high speed agitation or by passing through a colloid mill. Part B is then added to part A with vigorous agitation. Part C is then added and incorporated in the mixture of parts A and B by any of the methods indicated for preparation of the pigment slurry in Examples I, II, and V, that is by pony mixer, colloid mill, pebble or ball mill, or roller mill if the water content is sufficiently reduced.

In Examples I through IV, the plasticizer is a slow acting type. It is present in amount of about 16% by weight on the polyvinyl acetate. The surface active agent in each case is present in amount about 30% by weight on the plasticizer. Example V is a 50:50 combination of slow acting and quick acting plasticizers at a total concentration of about 32% by weight on the polyvinyl acetate. In this example, the surface active agents are present at a concentration of about 20% by weight on the total plasticizer.

In Examples VIII through XI the higher surface active agent concentration (16% slow acting plasticizer by weight of the polyvinyl acetate and 40% surface active agents) as compared to the other paints made with slow acting plasticizers may be explained by the fact that the emulsions had been stored for relatively long periods prior to use.

The paints and other compositions of the various examples were freeze stable after repeated freezing and thawing at temperatures within the range from about 30° F., to about —40° F. and were stable to storage temperatures up to 125° F. They had the other desirable characteristics mentioned at pages 6 and 6a and were capable of fulfilling the objects of the invention referred to above.

The procedures in examples and elsewhere are at normal temperatures, unless otherwise stated.

The viscosity in the examples, except for polyvinyl acetate itself, which is measured on an Ostwald viscosimeter, was determined on a Hoeppler viscosimeter. Similar measurements were made on the Brookfield and Brabender viscosimeters.

These variations in procedure of preparation of the paints as given for the examples have been set forth merely for purposes of illustration of the various processes which may be employed. Any of the paints may be prepared by any of the procedures indicated provided that suitable adjustments or modifications as to order of additions of the various ingredients, or as to concentration of water in the paint are made where necessary.

The paint base of Example VI corresponds to the paint of Example I while the paint base of Example VII corresponds to the paint of Example V. The paint bases may be manufactured by preparing solutions or dispersions of the surface active agents indicated in the water shown in part B, and then dispersing the plasticizer-resin mixture therein, finally adding part B to part A with vigorous agitation. The final paint base is a free flowing, opaque, whitish uniform liquid which on standing over long periods of time may exhibit some tendency to separate into several layers. We have found that improved stability against separation into layers of the paint base on aging is obtained by passing the entire paint base through a colloid mill. However, even if this separation does occur, vigorous agitation just before incorporation of the pigments is sufficient to insure production of a paint satisfactory in all respects and in accordance with the specifications of our invention. The pigments and whatever water is deemed or found desirable or necessary may be incorporated into the paint base by any of the usual methods employed in the paint industry for dispersion of pigments into the vehicle. By the term "keying" we have reference to the property of adhesion of the deposited film to old oil paint and similar films.

The term "paint" is now generally applied to various kinds of compositions composed essentially of a pigment, a binder, and usually also a volatile thinner, the composition when spread in a thin film being capable of drying either by oxidation of the binder or by evaporation of the thinner to yield a dry, continuous, decorative or protecting film, the paint composition being usually one which can be applied to a surface by brushing, spraying, roller coating, dipping or other conventional methods.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

1. A coating composition, comprising, as essential constituents a stable emulsion-polymerized aqueous polyvinyl acetate emulsion containing as emulsifying agent high molecular weight organic hydrophilic colloid having substantially only the hydrophilic groups effective at a concentration ranging from about .5% to 4% by weight of the emulsion, plasticizer for polyvinyl acetate in an amount within the range from 12% to 50% by weight of the polymer and effective to cause water-resistant pliable film formation, and at least one added water-soluble synthetic surface active agent having both hydrophilic and hydrophobic groups effective and selected from the group consisting of non-ionic, anionic and cationic surface active agents in an amount within the range from 20% to 75% by weight of the plasticizer and effective to prevent coalescence of the resin particles when the emulsion has been subjected to freezing and thawing, said composition being free from solvent odor, capable of forming a film resistant to water and to the effects of washing and scrubbing with aqueous materials.

2. A coating composition, comprising as essential constituents a stable emulsion-polymerized aqueous polyvinyl acetate emulsion containing as emulsifying agent high molecular weight organic hydrophilic colloid having substantially only the hydrophilic groups effective at a concentration ranging from about .5% to 4% by weight of the emulsion, plasticizer for polyvinyl acetate in an amount within the range from 12% to 50% by weight of the polymer and effective to cause water-resistant pliable film formation, and at least one added water-soluble synthetic surface active agent having both hydrophilic and hydrophobic groups effective and selected from the group consisting of non-ionic, anionic and cationic surface active agents above 20% by weight of the plasticizer and effective to prevent coalescence of the resin particles when the emulsion has been subjected to freezing and thawing, said composition being free from solvent odor, capable of forming a film resistant to water and to the effects of washing and scrubbing with aqueous materials.

3. A process of making a paint, comprising, selecting a stable emulsion-polymerized aqueous polyvinyl acetate emulsion containing as emulsifying agent high molecular weight organic hydrophilic colloid having substantially only the hydrophilic groups effective at a concentration ranging from about .5% to 4% by weight of the emulsion, incorporating into said emulsion plasticizer, pigment, and at least one water-soluble synthetic surface active agent having both hydrophilic and hydrophobic groups effective and selected from the group consisting of non-ionic, anionic and cationic surface active agents, the amount of plasticizer being within the range from 12% to 50% by weight of the resin, the amount of pigment being within the range from 25% to 70% by volume of the total non-volatile constituents of the emulsion, the amount of surface active agent being within the range from 20% to 75% by weight of the plasticizer and effective to prevent coalescence of the emulsion particles when the paint is subjected to freezing and thawing.

4. A process of making a coating composition, comprising, selecting a stable emulsion-polymerized aqueous polyvinyl acetate resin emulsion containing as emulsifying agent high molecular weight organic hydrophilic colloid having substantially only the hydrophilic groups effective at a concentration ranging from about .5% to 4% by weight of the emulsion, intimately dispersing throughout said emulsion with the aid of agitation plasticizer for polyvinyl acetate in an amount within the range from 5% to 50% by weight of the polyvinyl acetate and effective to cause water-resistant pliable film formation, and intimately dispersing throughout said emulsion at least one water-soluble synthetic surface active agent having both hydrophilic and hydrophobic groups effective and selected from the group consisting of non-ionic, anionic and cationic surface active agents in an amount within the range from 20% to 75% by weight of the plasticizer and effective to prevent coalescence of the resin particles when the composition is subjected to freezing and thawing.

5. A process, according to claim 4, wherein the plasticizer is dispersed in the emulsion, an aqueous dispersion is made of at least one water-soluble synthetic surface active agent having both hydrophilic and hydrophobic groups effective and selected from the group consisting of non-ionic, anionic and cationic surface active agents and a pigment and the latter dispersion is dispersed in the emulsion containing the plasticizer.

6. A process, as claimed in claim 4, wherein an aqueous dispersion of the plasticizer and at least one water soluble synthetic surface active agent having both hydrophilic and hydrophobic groups effective and selected from the group consisting of non-ionic, anionic and cationic surface active agents is made and this dispersion dispersed in the emulsion, and then pigment is added to the resulting dispersion.

DANIEL SCHOENHOLZ.
GEORGE O. MORRISON.

REFERENCES CITED

The following references are of record in the file of this patent:

UNITED STATES PATENTS

| Number | Name | Date |
|---|---|---|
| 2,316,629 | Schmitz | Apr. 13, 1943 |
| 2,343,095 | Smith | Feb. 29, 1944 |
| 2,373,347 | Schoenfeld | Apr. 10, 1945 |
| 2,388,600 | Collins | Nov. 6, 1945 |
| 2,388,601 | Collins | Nov. 6, 1945 |
| 2,398,344 | Collins | Apr. 16, 1946 |
| 2,444,396 | Collins et al. | June 29, 1948 |
| 2,459,955 | Morrison et al. | Jan. 25, 1949 |